United States Patent
Abedini et al.

(10) Patent No.: US 11,563,482 B2
(45) Date of Patent: Jan. 24, 2023

(54) CONFIGURATION OF A REPEATER VIA SYSTEM INFORMATION

(71) Applicant: QUALCOMM Incorporated, San Diego, CA (US)

(72) Inventors: Navid Abedini, Basking Ridge, NJ (US); Jianghong Luo, Skillman, NJ (US); Ashwin Sampath, Skillman, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 17/189,994

(22) Filed: Mar. 2, 2021

(65) Prior Publication Data

US 2021/0306065 A1 Sep. 30, 2021

Related U.S. Application Data

(60) Provisional application No. 62/994,955, filed on Mar. 26, 2020.

(51) Int. Cl.
*H04B 7/155* (2006.01)
*H04L 5/14* (2006.01)
*H04W 74/08* (2009.01)
*H04W 72/04* (2009.01)

(52) U.S. Cl.
CPC .......... *H04B 7/15528* (2013.01); *H04L 5/14* (2013.01); *H04W 72/042* (2013.01); *H04W 74/0833* (2013.01)

(58) Field of Classification Search
None
See application file for complete search history.

(56) References Cited

U.S. PATENT DOCUMENTS

| 9,065,533 | B2* | 6/2015 | Teyeb | H04B 7/2606 |
| 2013/0039185 | A1* | 2/2013 | Teyeb | H04W 28/06 370/235 |
| 2013/0070661 | A1* | 3/2013 | Nagata | H04W 72/0406 370/329 |
| 2013/0188612 | A1* | 7/2013 | Dinan | H04W 72/0486 370/336 |
| 2013/0188613 | A1* | 7/2013 | Dinan | H04W 72/0446 370/336 |

(Continued)

FOREIGN PATENT DOCUMENTS

WO WO-2019140344 A1 7/2019

OTHER PUBLICATIONS

International Search Report and Written Opinion—PCT/US2021/020607—ISA/EPO—Jun. 8, 2021.

*Primary Examiner* — Faiyazkhan Ghafoerkhan
(74) *Attorney, Agent, or Firm* — Harrity & Harrity, LLP

(57) ABSTRACT

Various aspects of the present disclosure generally relate to wireless communication. In some aspects, a wireless communication device may receive a system information block (SIB) including configuration information associated with configuring operation of a plurality of repeaters, wherein repeaters in the plurality of repeaters are configured to receive signals from first wireless communication devices and forward the signals to second wireless communication devices. The wireless communication device may communicate in a set of resources based at least in part on the configuration information included in the SIB. Numerous other aspects are provided.

30 Claims, 9 Drawing Sheets

(56) References Cited

U.S. PATENT DOCUMENTS

| | | | | |
|---|---|---|---|---|
| 2013/0188614 A1* | 7/2013 | Dinan | ............... | H04W 36/0072 370/336 |
| 2013/0242851 A1* | 9/2013 | Dinan | ................ | H04W 52/146 370/312 |
| 2013/0265991 A1* | 10/2013 | Dinan | ............... | H04W 72/0446 370/336 |
| 2013/0329708 A1* | 12/2013 | Dinan | ............... | H04W 72/0446 370/336 |
| 2015/0173028 A1* | 6/2015 | Dinan | .................. | H04W 28/18 455/522 |
| 2016/0029364 A1* | 1/2016 | Dinan | ............... | H04W 74/0833 370/336 |
| 2016/0081038 A1* | 3/2016 | Dinan | ................ | H04W 72/042 455/522 |
| 2016/0100409 A1* | 4/2016 | Dinan | ............... | H04W 56/0045 370/329 |
| 2016/0366632 A1* | 12/2016 | Cui | ....................... | H04W 40/04 |
| 2017/0332408 A1* | 11/2017 | Dinan | ............... | H04W 56/0005 |
| 2018/0063771 A1* | 3/2018 | Singh | ..................... | H04L 45/20 |
| 2018/0098370 A1* | 4/2018 | Bangolae | .............. | H04W 88/04 |
| 2018/0115343 A1* | 4/2018 | Shen | .................. | H04L 25/0224 |
| 2018/0242368 A1* | 8/2018 | Dinan | .................. | H04W 28/18 |
| 2018/0270801 A1* | 9/2018 | Novlan | .............. | H04W 72/042 |
| 2018/0352411 A1* | 12/2018 | Ryu | ..................... | H04W 40/24 |
| 2019/0059090 A1* | 2/2019 | Dinan | ................ | H04W 56/001 |
| 2019/0124696 A1* | 4/2019 | Islam | .................... | H04W 92/20 |
| 2019/0181943 A1* | 6/2019 | Liang | .................. | H04B 7/2606 |
| 2019/0306784 A1* | 10/2019 | Chen | ..................... | H04W 48/16 |
| 2019/0313401 A1* | 10/2019 | Wang | ................... | H04L 5/0094 |
| 2019/0387546 A1* | 12/2019 | Li | ...................... | H04L 27/26025 |
| 2020/0053796 A1* | 2/2020 | Agiwal | ................ | H04W 48/14 |
| 2020/0154266 A1* | 5/2020 | Novlan | ................ | H04W 72/0406 |
| 2020/0154492 A1* | 5/2020 | Dinan | ................ | H04W 74/0833 |
| 2020/0366363 A1* | 11/2020 | Li | ...................... | H04B 7/15542 |
| 2020/0412519 A1* | 12/2020 | Krishnaswamy | ...... | H04B 7/088 |
| 2021/0036762 A1* | 2/2021 | Abedini | .............. | H04W 48/08 |
| 2021/0067237 A1* | 3/2021 | Sampath | .............. | H04J 11/0073 |
| 2021/0185723 A1* | 6/2021 | Abedini | ........... | H04W 72/1289 |
| 2021/0298069 A1* | 9/2021 | Abedini | ........... | H04W 74/0833 |
| 2021/0306065 A1* | 9/2021 | Abedini | ................... | H04L 5/14 |

\* cited by examiner

CONFIGURATION OF A REPEATER VIA SYSTEM INFORMATION

CROSS-REFERENCE TO RELATED APPLICATION

This Patent Application claims priority to U.S. Provisional Patent Application No. 62/994,955, filed on Mar. 26, 2020, entitled "CONFIGURATION OF A REPEATER VIA SYSTEM INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for configuration of a repeater via system information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include receiving a system information block (SIB) including configuration information associated with configuring operation of a plurality of repeaters, wherein repeaters in the plurality of repeaters are configured to receive signals from first wireless communication devices and forward the signals to second wireless communication devices; and communicating in a set of resources based at least in part on the configuration information included in the SIB.

In some aspects, a method of wireless communication, performed by a base station, may include determining configuration information associated with configuring operation of a plurality of repeaters, wherein repeaters in the plurality of repeaters are configured to receive signals from first wireless communication devices and forward the signals to second wireless communication devices; and broadcasting a SIB, including the configuration information, for reception by at least the plurality of repeaters.

In some aspects, a wireless communication device for wireless communication may include a memory and one or more processors operatively coupled to the memory. The memory and the one or more processors may be configured to receive a SIB including configuration information associated with configuring operation of a plurality of repeaters, wherein repeaters in the plurality of repeaters are configured to receive signals from first wireless communication devices and forward the signals to second wireless communication devices; and communicate in a set of resources based at least in part on the configuration information included in the SIB.

In some aspects, a base station for wireless communication may include a memory and one or more processors operatively coupled to the memory. The memory and the one or more processors may be configured to determine configuration information associated with configuring operation of a plurality of repeaters, wherein repeaters in the plurality of repeaters are configured to receive signals from first wireless communication devices and forward the signals to second wireless communication devices; and broadcast a SIB, including the configuration information, for reception by at least the plurality of repeaters.

In some aspects, a non-transitory computer-readable medium may store one or more instructions for wireless communication. The one or more instructions, when executed by one or more processors of a wireless communication device, may cause the one or more processors to receive a SIB including configuration information associated with configuring operation of a plurality of repeaters, wherein repeaters in the plurality of repeaters are configured to receive signals from first wireless communication devices and forward the signals to second wireless communication devices; and communicate in a set of resources based at least in part on the configuration information included in the SIB.

In some aspects, a non-transitory computer-readable medium may store one or more instructions for wireless communication. The one or more instructions, when executed by one or more processors of a base station, may cause the one or more processors to determine configuration information associated with configuring operation of a plurality of repeaters, wherein repeaters in the plurality of repeaters are configured to receive signals from first wireless communication devices and forward the signals to second wireless communication devices; and broadcast a SIB, including the configuration information, for reception by at least the plurality of repeaters.

In some aspects, an apparatus for wireless communication may include means for receiving a SIB including configuration information associated with configuring operation of a plurality of repeaters, wherein repeaters in the plurality of repeaters are configured to receive signals from first wireless communication devices and forward the signals to second wireless communication devices; and means for communicating in a set of resources based at least in part on the configuration information included in the SIB.

In some aspects, an apparatus for wireless communication may include means for determining configuration information associated with configuring operation of a plurality of repeaters, wherein repeaters in the plurality of repeaters are configured to receive signals from first wireless communication devices and forward the signals to second wireless communication devices; and means for broadcasting a SIB, including the configuration information, for reception by at least the plurality of repeaters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
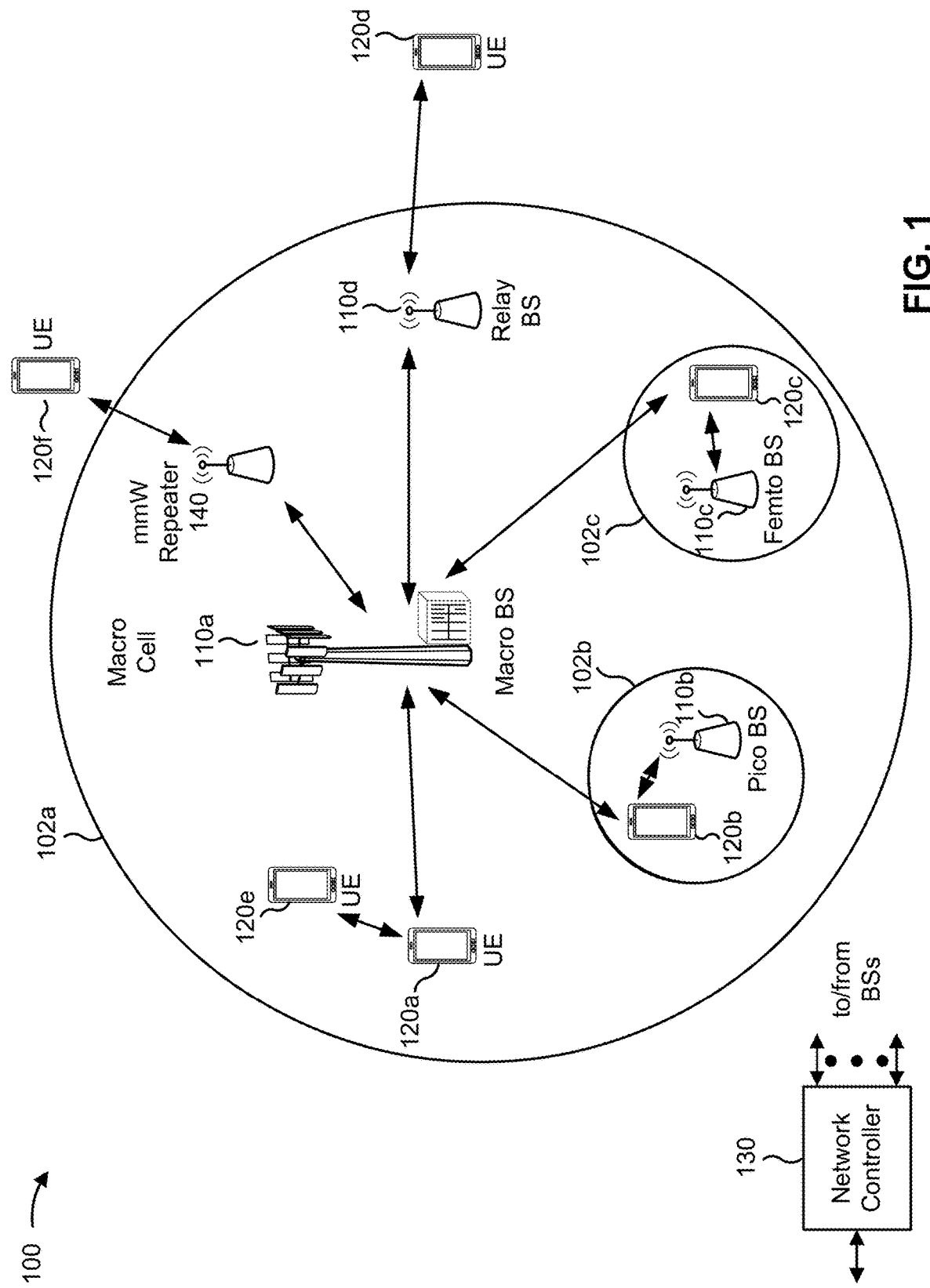
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs)

and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

In some aspects, millimeter wave (mmW) repeater 140 (sometimes referred to herein as a repeater 140) may receive an analog millimeter wave signal from a base station 110, may amplify the analog millimeter wave signal, and may transmit the amplified millimeter wave signal to one or more UEs 120 (e.g., shown as UE 120f). In some aspects, the mmW repeater 140 may be an analog mmW repeater, sometimes also referred to as a layer 1 mmW repeater. Additionally, or alternatively, the mmW repeater 140 may be a wireless TRP acting as a distributed unit (e.g., of a 5G access node) that communicates wirelessly with a base station 110 acting as a central unit or an access node controller (e.g., of the 5G access node). The mmW repeater may receive, amplify, and transmit the analog mmW signal without performing analog-to-digital conversion of the analog mmW signal and/or without performing any digital signal processing on the mmW signal. In this way, latency may be reduced and a cost to produce the mmW repeater 140 may be reduced. Additional details regarding mmW repeater 140 are provided elsewhere herein.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
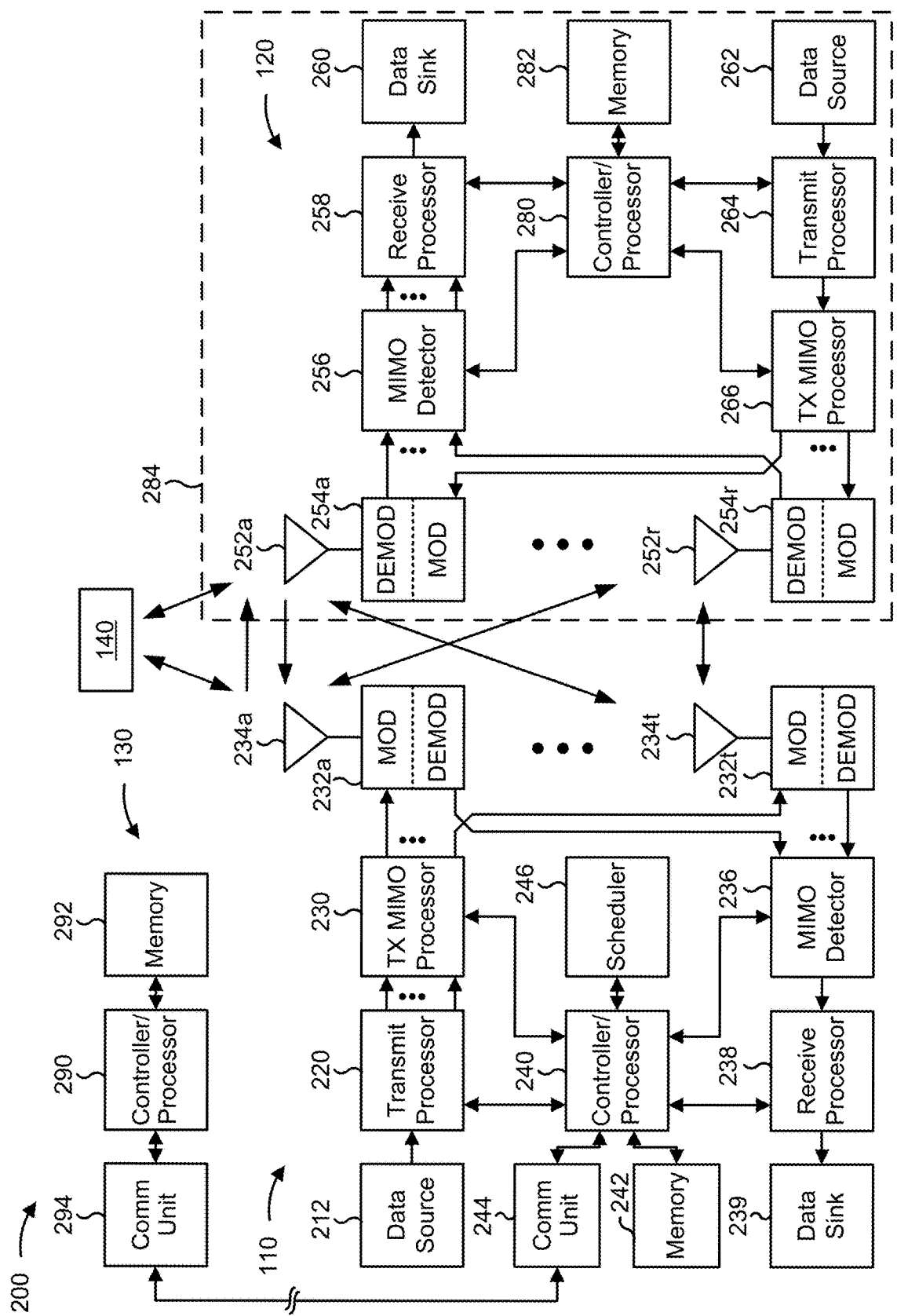
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-8).

Controller/processor 240 of base station 110, controller/processor 280 of UE 120, and/or any other component(s) of FIG. 2 may perform one or more techniques associated with configuration of a repeater via system information, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8 and/or other processes as described herein. In some aspects, executing instructions may include running the instructions, converting the instructions, compiling the instructions, and/or interpreting the instructions, among other examples.

In some aspects, UE 120 may include means for receiving a SIB including configuration information associated with configuring operation of a plurality of repeaters; means for communicating in a set of resources based at least in part on the configuration information included in the SIB, wherein repeaters in the plurality of repeaters are configured to receive signals from first wireless communication devices and forward the signals to second wireless communication devices; and/or the like. In some aspects, such means may include one or more components of UE 120 described in connection with FIG. 2, such as antenna 252, DEMOD 254, MIMO detector 256, receive processor 258, controller/processor 280, transmit processor 266, TX MIMO processor 266, MOD 254, and/or the like.

In some aspects, base station 110 may include means for receiving a SIB including configuration information associated with configuring operation of a plurality of repeaters; means for communicating in a set of resources based at least in part on the configuration information included in the SIB, wherein repeaters in the plurality of repeaters are configured to receive signals from first wireless communication devices and forward the signals to second wireless communication devices; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or the like.

In some aspects, base station 110 may include means for determining configuration information associated with configuring operation of a plurality of repeaters; means for broadcasting a SIB, including the configuration information, for reception by at least the plurality of repeaters, wherein repeaters in the plurality of repeaters are configured to receive signals from first wireless communication devices and forward the signals to second wireless communication devices; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
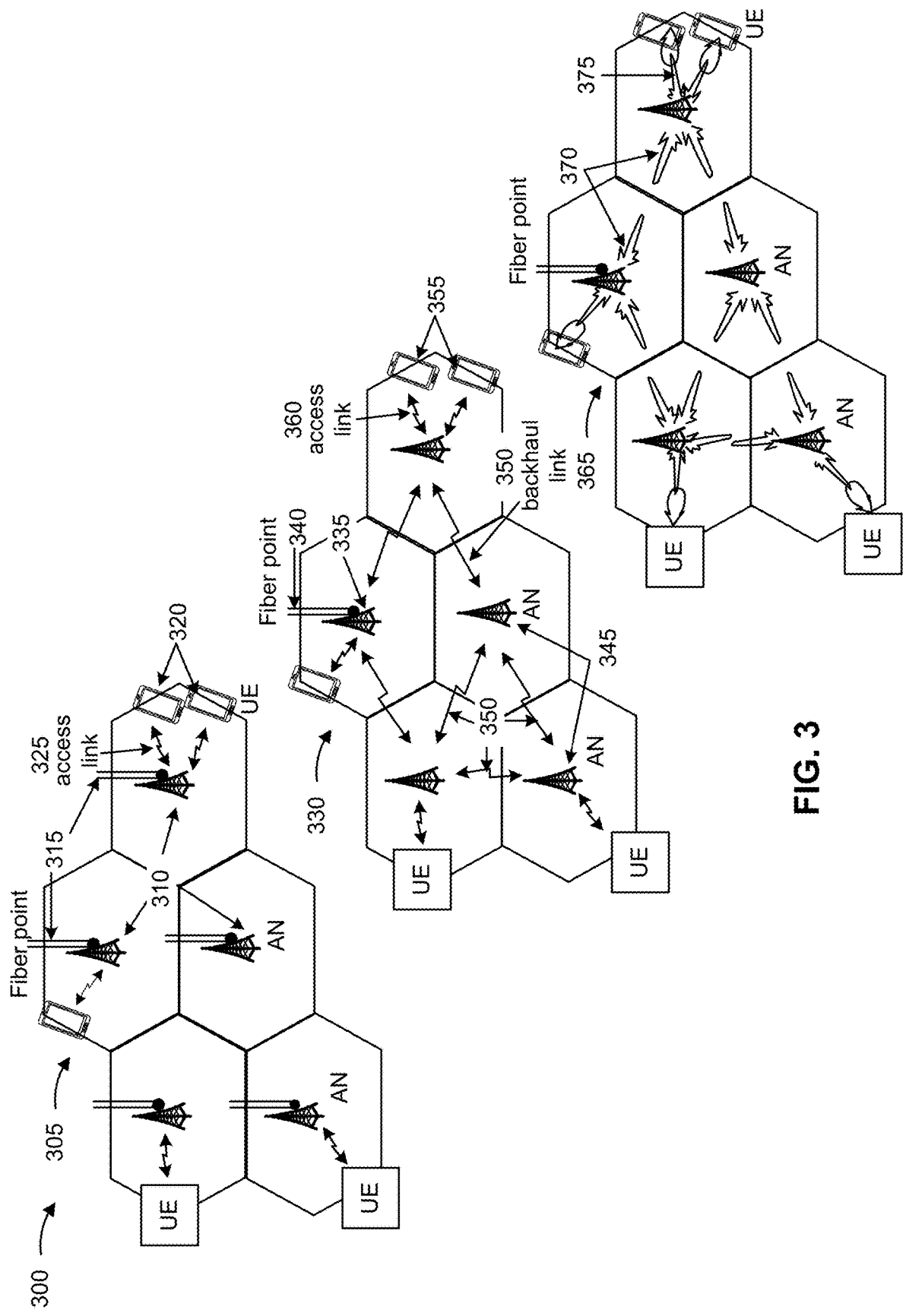
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

In some aspects, an IAB network may support a multi-hop wireless backhaul. Additionally, or alternatively, nodes of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
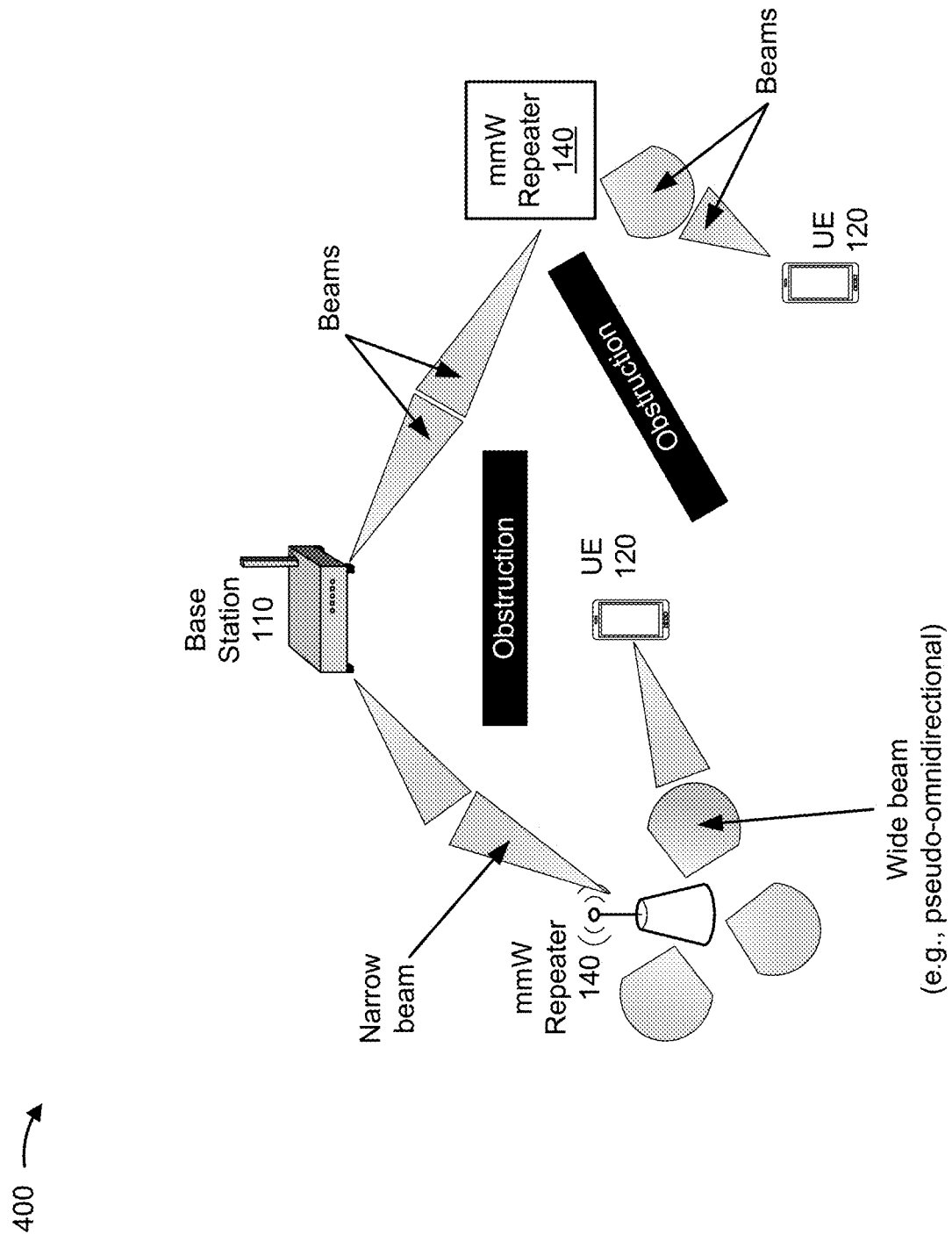
FIG. 4 is a diagram illustrating an example of communicating using a millimeter wave repeater, in accordance with the present disclosure.

FIG. 4 is a diagram illustrating an example 400 of communicating using an analog millimeter wave repeater, in accordance with the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 110 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 to increase the coverage area of a base station 110, to extend coverage to UEs 120 without line of sight to the base station 110 (e.g., due to an obstruction), and/or the like. Furthermore, the millimeter wave repeater 140 described herein may be a layer 1 or an analog millimeter wave repeater, which is associated with a lower cost, less processing, and lower latency than a layer 2 or layer 3 repeater.

As shown in FIG. 4, a millimeter wave repeater 140 may perform directional communication by using beamforming to communicate with a base station 110 via a first beam (e.g., a backhaul beam over a backhaul link with the base station 110) and to communicate with a UE 120 via a second beam (e.g., an access beam over an access link with the UE 120). To achieve long propagation distances and/or to satisfy a required link budget, the millimeter wave repeater may use narrow beams (e.g., with a beam width less than a threshold) for such communications.

However, using a narrower beam requires the use of more resources of the millimeter wave repeater 140 (e.g., processing resources, memory resources, power, battery power, and/or the like) and more network resources (e.g., time resources, frequency resources, spatial resources, and/or the like), as compared to a wider beam, to perform beam training (e.g., to determine a suitable beam), beam maintenance (e.g., to find suitable beam as conditions change due to mobility and/or the like), beam management, and/or the like. This may waste resources of the millimeter wave repeater 140 and/or network resources as compared to using a wider beam, and may lead to increased cost of production of millimeter wave repeaters 140, which may be deployed extensively throughout a radio access network.

For example, a millimeter wave repeater 140 may be deployed in a fixed location with limited or no mobility, similar to a base station 110. As shown in FIG. 4, the millimeter wave repeater 140 may use a narrower beam to communicate with the base station 110 without unnecessarily consuming network resources and/or resources of the millimeter wave repeater 140 because the need for beam training, beam maintenance, and/or beam management may be limited, due to limited or no mobility of the base station 110 and the millimeter wave repeater 140 (and/or due to a line of sight communication path between the base station 110 and the millimeter wave repeater 140).

As further shown in FIG. 4, the millimeter wave repeater 140 may use a wider beam (e.g., a pseudo-omnidirectional beam and/or the like) to communicate with one or more UEs 120. This wider beam may provide wider coverage for access links, thereby providing coverage to mobile UEs 120 without requiring frequent beam training, beam maintenance, and/or beam management. In this way, network resources and/or resources of the millimeter wave repeater 140 may be conserved. Furthermore, if the millimeter wave repeater 140 does not include digital signal processing capabilities, resources of the base station 110 (e.g., processing resources, memory resources, and/or the like) may be conserved that would otherwise be used to perform such signal processing for the millimeter wave repeater 140, and network resources may be conserved that would otherwise be used to communicate input to or output of such processing between the base station 110 and the millimeter wave repeater 140.

In this way, the millimeter wave repeater 140 may increase a coverage area, provide access around obstructions (as shown), and/or the like, while conserving resources of the base station 110, resources of the millimeter wave repeater 140, network resources, and/or the like. Additional details are described below.

As indicated above, FIG. 4 is provided as an example. Other examples may differ from what is described with regard to FIG. 4.

Figure 5A:
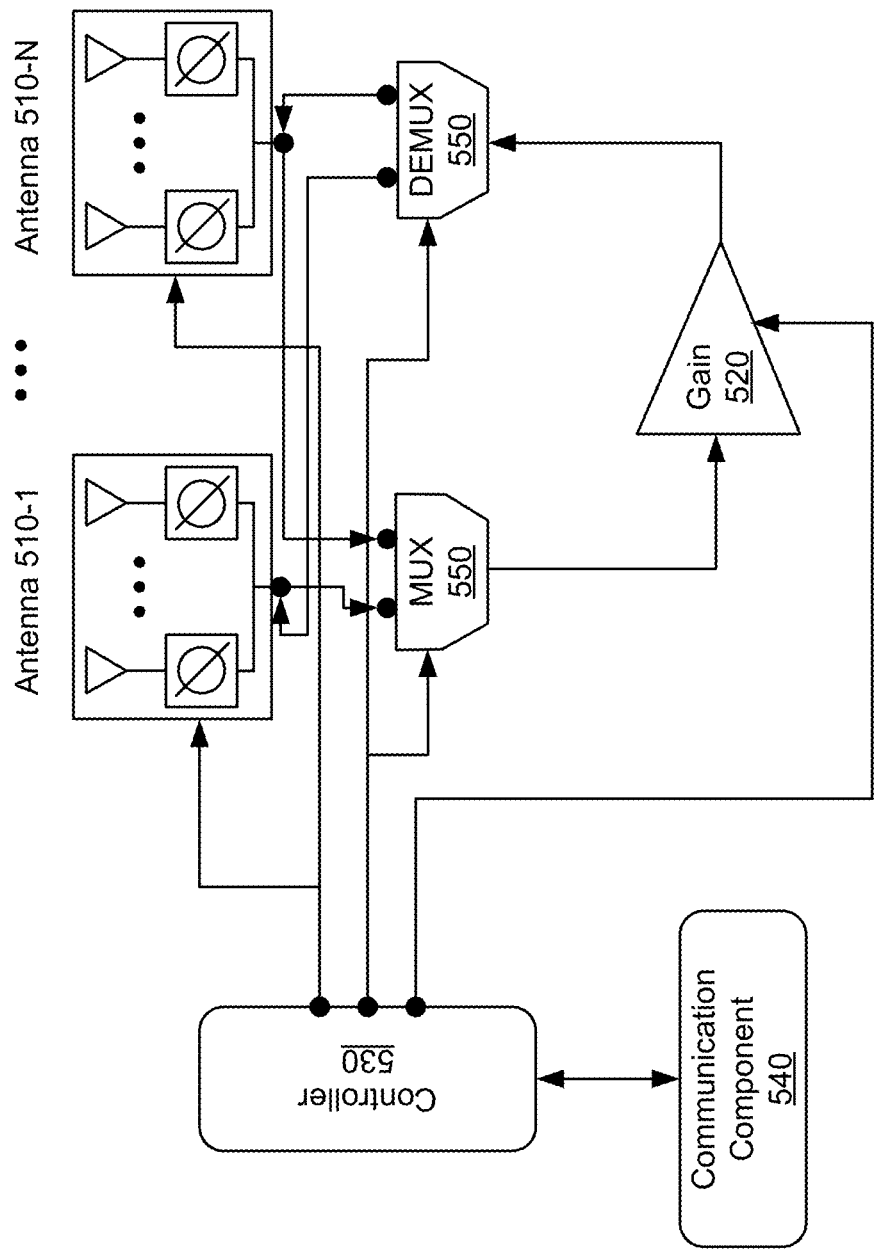
FIGS. 5A and 5B are diagrams illustrating example millimeter wave repeaters, in accordance with the present disclosure.
Figure 5B:
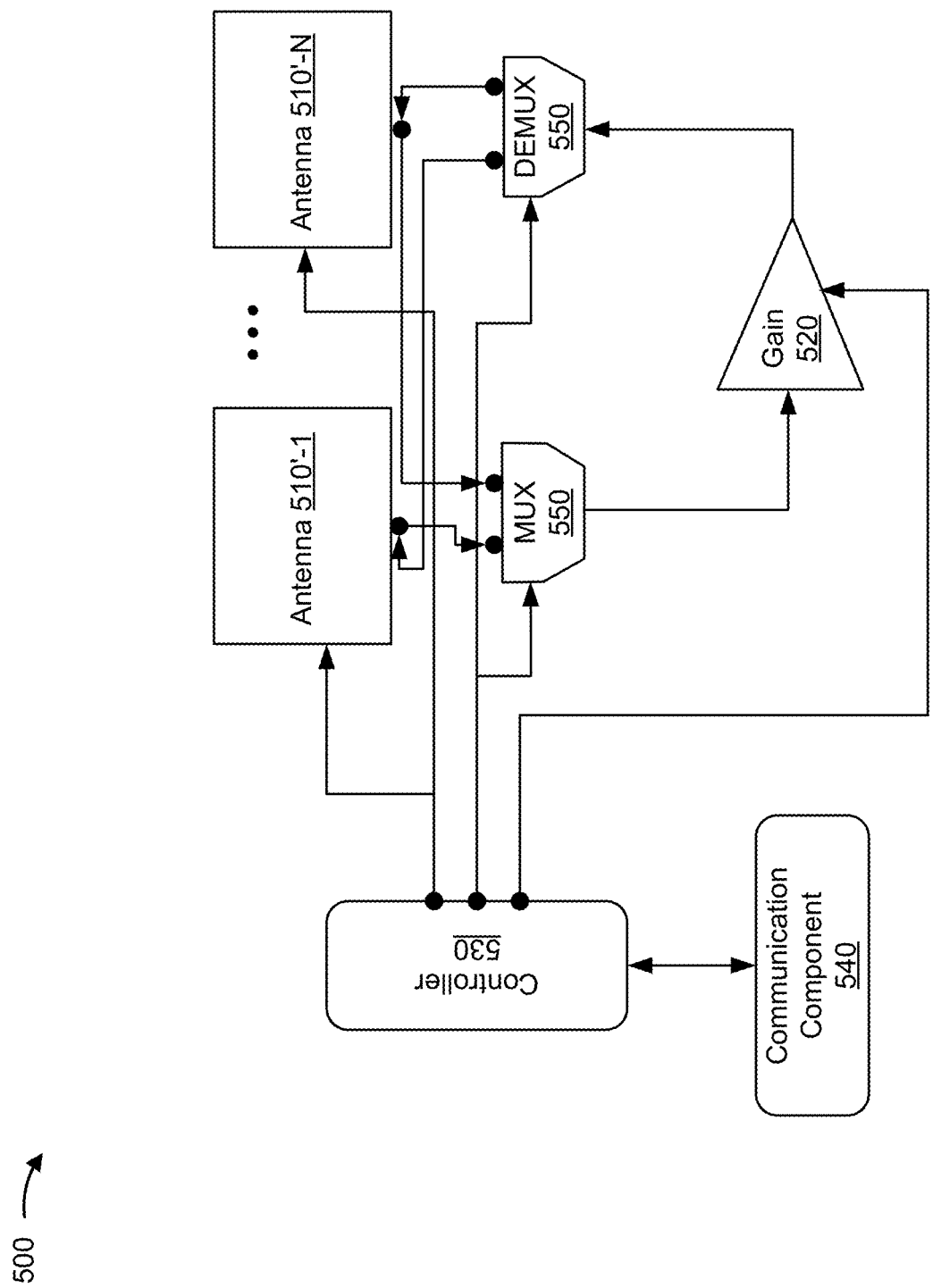

FIGS. 5A and 5B are diagrams illustrating examples of a millimeter wave repeater 500, in accordance with the present disclosure. In some aspects, millimeter wave repeater 500 may correspond to millimeter wave repeater 140 shown in FIG. 1.

As shown in FIG. 5A, in some aspects, the millimeter wave repeater 500 may include one or more phased array antennas 510-1 through 510-N (N>1), a gain component 520, a controller 530, a communication component 540, and a multiplexer (MUX) and/or demultiplexer (DEMUX) (MUX/DEMUX) 550.

As shown in FIG. 5B, in some aspects, the millimeter wave repeater 500 may include one or more metamaterial antennas 510'-1 through 510'-N, gain component 520, controller 530, communication component 540, and one or more MUX/DEMUX 550.

An antenna 510/510' includes one or more antenna elements capable of being configured for beamforming. In some aspects, as illustrated in FIG. 5A, millimeter wave repeater 500 may include one or more phased array antennas 510, which may be referred to as a phased array because phase values and/or phase offsets of the antenna elements may be configured to form a beam, with different phase values and/or phase offsets being used for different beams (e.g., in different directions).

In some aspects, as illustrated in FIG. 5B, millimeter wave repeater 500 may include one or more metamaterial antennas 510'. In some aspects, a metamaterial antenna may comprise a synthetic material with negative permittivity and/or permeability, which yields a negative refractive index. Due to the resulting superior antenna gain and electro-magnetic lensing, the metamaterial antenna may not need to be used in a phased-array configuration. However, if in phased-array configuration, antenna spacing could be less than a typically used spacing of lambda/2, where lambda refers to a wavelength of the radio frequency (RF) carrier signal. In some aspects, due to superior beamforming, the metamaterial antenna may reduce leakage back to the receive (RX) antenna and may reduce a chance of instability in the RF chain. Hence, the use of metamaterial antennas may reduce or obviate a need for a feedback path.

In some aspects, an antenna 510/510' may be a fixed RX antenna capable of only receiving communications, and not transmitting communications. In some aspects, an antenna 510/510' may be a fixed transmit (TX) antenna capable of only transmitting communications, and not receiving communications. In some aspects, an antenna 510/510' may be capable of being configured to act as an RX antenna or a TX antenna (e.g., via a TX/RX switch, a MUX/DEMUX, and/or the like). The antennas 510/510' may be capable of communicating using millimeter waves.

Gain component 520 includes a component capable of amplifying an input signal and outputting an amplified signal. For example, gain component 520 may include a power amplifier, a variable gain component, and/or the like. In some aspects, gain component 520 may have variable gain control. The gain component 520 may connect to an RX antenna (e.g., a first antenna 510/510'-1) and a TX antenna (e.g., a second antenna 510/510'-2) such that an analog millimeter wave signal, received via the RX antenna, can be amplified by the gain component 520 and output to the TX antenna for transmission. In some aspects, the level of amplification of the gain component 520 may be controlled by the controller 530.

Controller 530 includes a component capable of controlling one or more other components of the millimeter wave repeater 500. For example, the controller 530 may include a controller, a microcontroller, a processor, and/or the like. In some aspects, the controller 530 may control the gain component 520 by controlling a level of amplification or gain applied by the gain component 520 to an input signal. Additionally, or alternatively, the controller 530 may control an antenna 510/510' by controlling a beamforming configuration for the antenna 510/510' (e.g., one or more phase values for the antenna 510/510', one or more phase offsets for the antenna 510/510', one or more power parameters for the antenna 510/510', one or more beamforming parameters for the antenna 510/510', a TX beamforming configuration, an RX beamforming configuration, and/or the like), by controlling whether the antenna 510/510' acts as an RX antenna or a TX antenna (e.g., by configuring interaction and/or connections between the antenna 510/510' and a MUX/DEMUX 550), and/or the like. Additionally, or alternatively, the controller 530 may power on or power off one or more components of millimeter wave repeater 500 (e.g., when a base station 110 does not need to use the millimeter wave repeater to serve UEs 120). In some aspects, the controller 530 may control a timing of one or more of the above configurations.

Communication component 540 may include a component capable of wirelessly communicating with a base station 110 using a wireless technology other than millimeter wave. For example, the communication component 540 may communicate with the base station 110 using a personal area network (PAN) technology (e.g., Bluetooth, Bluetooth Low Energy (BLE), and/or the like), a 4G or LTE radio access technology, a narrowband Internet of Things (NB-IoT) technology, a visible light communication technology, and/or the like. In general, the communication component 540 enables communication (e.g., with base station 110) via a low frequency (LF) interface (e.g., an interface that uses a sub-6 GHz frequency). In some aspects, the communication component 540 may use a low frequency communication technology, and an antenna 510/510' may use a higher frequency (HF) communication technology (e.g., millimeter wave and/or the like). In some aspects, an antenna 510/510' may be used to transfer data between the millimeter wave repeater 500 and the base station 110, and the communication component 540 may be used to transfer control information between the millimeter wave repeater 500 and the base station 110 (e.g., a report, a configuration, instructions to power on or power off one or more components, and/or the like).

MUX/DEMUX 550 may be used to multiplex and/or demultiplex communications received from and/or transmitted to an antenna 510/510'. For example, MUX/DEMUX 550 may be used to switch an RX antenna to a TX antenna.

In some aspects, the millimeter wave repeater 500 does not include any components for digital signal processing. For example, the millimeter wave repeater 500 may not include a digital signal processor, a baseband processor, a digital-to-analog converter (DAC), an analog-to-digital converter (ADC), and/or the like. In this way, a cost to produce the millimeter wave repeater 500 may be reduced. Furthermore, latency may be reduced by eliminating digital processing of received millimeter wave signals prior to transmission of corresponding amplified millimeter wave signals.

In some aspects, one or more antennas 510/510', gain component 520, controller 530, communication component 540, MUX/DEMUX 550, and/or the like may perform one or more operations associated with configuration of a repeater via system information, as described in more detail elsewhere herein. For example, one or more components of millimeter wave repeater 500 may perform or direct operations of, for example, process 700 of FIG. 7, and/or other processes as described herein.

In some aspects, millimeter wave repeater 500 may include means for receiving a SIB including configuration information associated with configuring operation of a plurality of repeaters, wherein repeaters in the plurality of repeaters are configured to receive signals from first wireless communication devices and forward the signals to second wireless communication devices; means for communicating in a set of resources based at least in part on the configuration information included in the SIB; and/or the like. In some aspects, such means may include one or more components of millimeter wave repeater 500 described in connection with FIGS. 5A and 5B, such as antenna 510/510', gain component 520, controller 530, communication component 510, MUX/DEMUX 550, and/or the like.

As indicated above, FIGS. 5A and 5B are provided as an example. Other examples may differ from what is described with regard to FIGS. 5A and 5B. For example, millimeter wave repeater 500 may include additional components, fewer components, different components, or differently arranged components than those shown in FIGS. 5A and 5B. Furthermore, two or more components shown in FIGS. 5A and 5B may be implemented within a single component, or a single component shown in FIGS. 5A and 5B may be implemented as multiple components. Additionally, or alternatively, a set of components (e.g., one or more components) of millimeter wave repeater 500 may perform one or more functions described as being performed by another set of components of millimeter wave repeater 500.

In a wireless communication system, a backhaul link may be established between a base station (e.g., a base station 110) and a repeater (e.g., a mmW repeater 140). The backhaul link can be used, for example, as a control path for carrying signals (e.g., uplink signals and/or downlink signals) associated with configuring the repeater. A repeater for which operation can be configured in such a way can be referred to as a smart repeater or a hybrid node. In some cases, the backhaul link may use a relatively small bandwidth part in the mmW frequency range (e.g., in FR2) and may achieve a relatively low data rate. Further, an access link may be established between the base station and a UE (e.g., UE 120), with the repeater being configured to act as a relay between the base station and the UE (e.g., such that the repeater receives and forwards signals on the access link). The access link can be used, for example, as a data path for carrying signals (e.g., uplink signals and/or downlink signals) between the base station and the UE. In some cases, the access link may use a relatively larger bandwidth in the mmW frequency range and may achieve a relatively high data rate. In some deployments, signals on the backhaul link can be multiplexed (e.g., frequency domain multiplexed (FDM)) with signals on the access link.

Operation of the repeater with respect to the access link can be configured via the backhaul link. That is, operation of the repeater in association with receiving and forwarding signals on the access link can be configured via the backhaul link. For example, the backhaul link can be used to configure the repeater with a beamforming configuration to be used on the access link (e.g., a configuration indicating one or more beams to be used for receiving or forwarding a signal), a switching configuration to be used on the access link (e.g., a configuration indicating whether the repeater is to receive and forward signals on the downlink or the uplink), and a schedule to be used on the access link (e.g., an indication of time resources in which to adopt the beamforming and switching configurations). Additional examples of configurations that may be provided via the backhaul link include a transmit power configuration for the access link (e.g., a configuration indicating a transmit power to be used when forwarding a signal) and an on-off configuration to be used on the access link (e.g., a configuration indicating whether the repeater is to forward signals or refrain from forwarding signals).

In some cases, such configurations of the repeater can be provided using a control signal on the backhaul link. For example, a downlink control information (DCI) format may be defined to enable information associated with one or more of the above configurations to be provided. In some cases, such a control signal may be a common-purpose control signal (e.g., a DCI) that can be used to configure (e.g., dynamically and/or semi-statically) operation of the repeater in a set of upcoming resources. A common-purpose control signal may, in some cases, be designed to be used for configuring operation of the repeater as related to any procedure associated with the access link.

Typically, a base station transmits control signals (e.g., common-purpose control signals) to each repeater in a group of multiple repeaters (individually) in association with configuring operation of the group of repeaters. For example, the base station can transmit one or more control signals to a first repeater in the group of repeaters in association with configuring operation of the first repeater, can transmit one or more second control signals to a second repeater in the group of repeaters in association with configuring operation of the second repeater, and so on. However, individual configuration of the group of repeaters in such a way may result in an undesirable amount of signaling overhead and/or inefficient resource usage (e.g., due to the number or frequency of control signals needed and/or the amount of information to be conveyed in the common-purpose control signals).

Some aspects described herein provide techniques and apparatuses for configuration of a repeater (e.g., a mmW repeater 140) via system information. In some aspects, as described below, system information (e.g., a system information block (SIB)) that is broadcast for reception by a group of repeaters may be used to simplify configuration of the group of repeaters, which may reduce signaling overhead and/or improve resource usage efficiency associated with configuring operation of the group of repeaters. For example, one or more cell-specific configurations may be applicable to all repeaters in a cell associated with a base station. In such a case, broadcasting configuration information in the SIB (e.g., in remaining minimum system information (RMSI), in other system information, or the like) for reception by the repeaters reduces signaling overhead and/or improves resource usage efficiency in association with configuration of operation of the group of repeaters.

In some aspects, configuration of the group of repeaters via system information reduces a number of control signals that need to be transmitted by a base station and received by a given repeater. Further, configuration of the group of repeaters via system information may require a comparatively smaller amount of configuration information via typical control signals. In some aspects, as described in further detail below, a base station may determine configuration information associated with configuring operation of a group of repeaters, and broadcast a SIB including the configuration information (e.g., such that the SIB can be received by the group of repeaters). A repeater may receive the SIB including the configuration information, and may communicate in a set of resources based at least in part on the configuration information included in the SIB. Similarly, in some aspects, another type of wireless communication device (e.g., a UE, an IAB node, or the like) may receive the SIB including the configuration information, and may communicate in a set of resources based at least in part on the configuration information.

Figure 6:
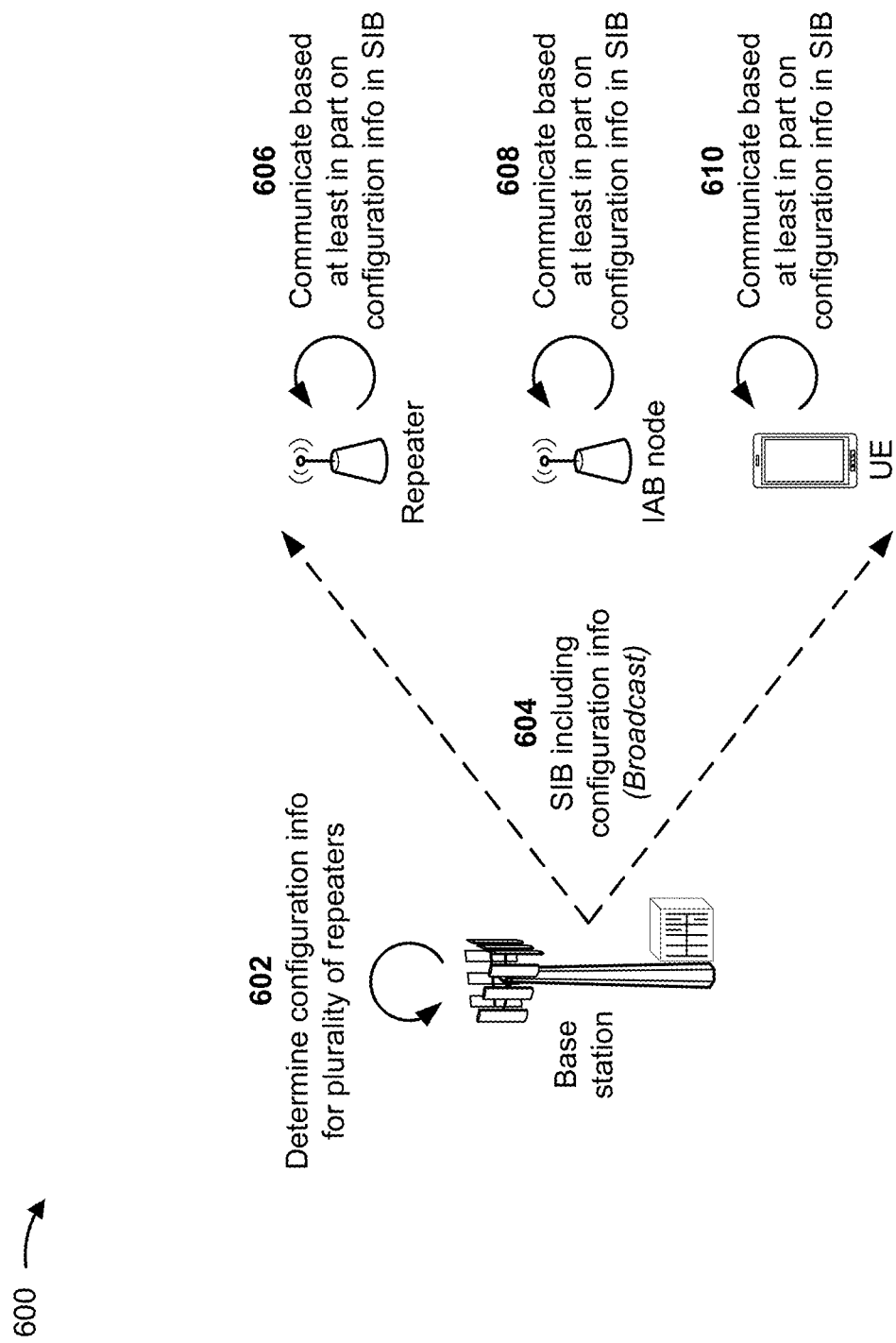
FIG. 6 is a diagram illustrating an example associated with configuration of a repeater via system information, in accordance with the present disclosure.

FIG. 6 is a diagram illustrating an example 600 associated with configuration of a repeater (e.g., a mmW repeater 140) via system information, in accordance with the present disclosure.

As shown by reference 602, a base station (e.g., a base station 110) may determine configuration information associated with configuring operation of a plurality of repeaters (e.g., a plurality of mmW repeaters 140) in association with receiving and/or forwarding signals. In some aspects, the configuration information may include information that is applicable to the plurality of repeaters. That is, the configuration information may include configuration information that can be used in association with configuring each of the plurality of repeaters for operation in association with receiving and/or forwarding signals. As an example, in some aspects, the configuration information may include information associated with a cell-specific configuration that applies to each repeater of the plurality of repeaters.

In some aspects, the configuration information may be used for partitioning resources associated with an access procedure (e.g., resources that are to carry signals associated with an initial access procedure). For example, the configuration information may used for partitioning resources associated with an access procedure into a first set of resources and a second set of resources. In some aspects, the first set of resources may be, for example, a set of resources in which signals are not to be forwarded by the plurality of repeaters (e.g., a set of resources in which the plurality of repeaters are to refrain from forwarding signals associated with the access procedure), while the second set of resources may be a set of resources in which signals are to be forwarded by the plurality of repeaters (e.g., a set of resources in which the plurality of repeaters are to forward signals associated with the access procedure). In some aspects, the partitioning of the resources may be indicated by a set of synchronization signal block (SSB) indices. Here, each SSB index of the set of SSB indices may correspond to a respective SSB in a set of SSBs associated with an access procedure. In some aspects, the configuration information may include information indicating a set of SSB indices associated with the first set of resources (e.g., the set of resources in which the repeaters are not to forward signals) and/or may indicate a set of SSB indices associated with the second set of resources in association with partitioning the resources (e.g., the set of resources in which the repeaters are to forward signals).

In some aspects, the first set of resources can be used for providing direct connections to the base station. For example, since the repeaters are not to forward signals in the first set of resources, the first set of resources can be used by wireless communication devices (e.g., repeaters, UEs, IAB nodes, or the like) to directly connect to the base station (e.g., rather than connecting to the base station via one or more of the plurality of repeaters). Conversely, the second set of resources can, in some aspects, be used for providing indirect connections to the base station. For example, since the repeaters are to forward signals in the second set of resources, the second set of resources can be used by wireless communication devices to connect to the base station via one or more of the plurality of repeaters (e.g., rather than directly connecting to the base station). In one example of operation, during an initial integration with the base station, a given repeater may identify, based at least in part on the SSB indices indicated in the configuration information, one or more SSBs that would provide a direct connection to the base station, and may use the identified one or more SSBs for initial integration. Here, the repeater may avoid (or deprioritize) the use of SSBs that may result in accessing the base station indirectly (e.g., through another repeater). A similar operation can be performed during initial access by a wireless communication device of another type (e.g., a UE, an IAB node, or the like) when the wireless communication device can receive and process the configuration information, associated with configuring the plurality of repeaters, that is broadcast by the base station.

In some aspects, resources that are to carry signals associated with the set of SSBs can be similarly partitioned based at least in part on the indicated SSB indices. The resources that are to carry the signals associated with the set of SSBs may include, for example, resources associated with carrying physical downlink control channels (PDCCHs) associated with scheduling RMSI associated with the set of SSBs, RACH messages carried in RACH occasions associated with the set of SSBs, PDCCHs associated with scheduling RACH responses, and/or the like. In some aspects, a given repeater would have previously received information indicating a location (e.g., in a time-domain) of the set of SSBs (e.g., based on a bitmap received in SIM and/or one or more radio resource control (RRC) messages that indicate the location of actually transmitted SSBs) and the resources of the signals associated with the set of SSBs. Here, this previously received information can be leveraged to partition the resources that are to carry the signals associated with the set of SSBs, thereby simplifying configuration of partitioning for a given repeater.

In some aspects, the configuration information may be associated with configuring a parameter associated with control messages. That is, in some aspects, the configuration information can include information associated with configuring a parameter associated with a repeater control message (and broadcast in the system information). The parameter may be associated with, for example, a cell-specific PDCCH (e.g., a cell-specific PDCCH configuration and resources) for a DCI format to be used for the control messages. As another example, the parameter may be associated with a bandwidth part configuration associated with the control messages.

In some aspects, the configuration information may be associated with configuring a value for a parameter. The parameter may be associated with, for example, a maximum number of beams or a maximum number of SSBs that can be used by a given repeater of the plurality of repeaters (e.g., a maximum number of beams a repeater can use on a service-side). As another example, the parameter may be associated with configuring or scheduling a given repeater of the plurality of repeaters. Here, the value may be a time offset value (e.g., a value for a time offset between a time DCI is sent and a time a configuration should be implemented). As another example, the value may be an offset or absolute value associated with controlling power of a repeater of the plurality of repeaters.

In some aspects, the configuration information may include a time division duplexing (TDD) configuration (e.g., a default TDD configuration) associated with determining a forwarding direction for a set of resources. A forwarding direction may indicate a direction associated with forwarding signals carried in the set of resources. For example, the forwarding direction may be a downlink forwarding direction, meaning that a signal carried in the set of resources is associated with a downlink communication and, therefore, that the repeater should forward the signal on the downlink. As another example, the forwarding direction may be an uplink forwarding direction, meaning that a signal carried in the set of resources is associated with an uplink communication and, therefore, that the repeater should forward the signal on the uplink. As another example, the forwarding direction may be a full-duplex forwarding direction, meaning that the repeater should forward the signal on both the downlink and the uplink. As another example, the forwarding direction may be a null forwarding direction, meaning that a signal carried in the set of resources should not be forwarded by the repeater (i.e., the repeater should refrain from forwarding the signal).

In some aspects, the configuration information may include a RACH configuration associated with an access procedure. That is, in some aspects, the configuration information may include a RACH configuration (e.g., a specific RACH configuration, a dedicated RACH configuration) that can be used by the plurality repeaters for an initial access procedure and/or another access procedure (e.g., a contention free random access (CFRA) procedure, or a contention based random access (CBRA) procedure).

As shown by reference 604, the base station may broadcast a SIB, including the configuration information, for reception by (at least) the plurality of repeaters. In some aspects, the configuration information is included in RMSI in the SIB. In some aspects, the configuration information is included in other system information in the SIB.

In some aspects, a wireless communication device (e.g., a repeater, a UE, an IAB node, or the like) may receive the SIB including the configuration information associated with configuring operation of the plurality of repeaters, and may communicate in a set of resources based at least in part on the configuration information included in the SIB. That is, the wireless communication device may receive the SIB including the configuration information associated with the plurality of repeaters, and may receive, (selectively) forward, and/or transmit communications based at least in part on the configuration information.

As shown by reference 606, in some aspects, the wireless communication device may be a repeater (i.e., a repeater included in the plurality of repeaters). In some aspects, the repeater has a control interface to the base station associated with configuring operation of the repeater. As shown by reference 608, in some aspects, the wireless communication device may be an IAB node (e.g., a base station 110, a non-anchor base station 345, or the like). As shown by reference 610, in some aspects, the wireless communication device may be a UE (e.g., a UE 120).

In some aspects, communicating in the set of resources includes selectively forwarding a signal received in the set of resources based at least in part on the configuration information. In some aspects, the signal may be associated with an SSB corresponding to an SSB index (e.g., an SSB index included in a set of SSB indices indicated in the configuration information), or may be a signal associated with the SSB (e.g., a PDCCH associated with scheduling RMSI associated with the SSB, a RACH message associated with the SSB, a PDCCH associated with scheduling RACH responses for the RACH messages associated with the SSB, or the like). For example, the configuration information may include information associated with partitioning resources associated with an access procedure into a first set of resources and a second set of resources, as described above. Here, the wireless communication device may select, based at least in part on the configuration information, an SSB to be used in association with performing an access procedure (e.g., the repeater may select an SSB corresponding to an SSB index indicated as one for which repeaters are to forward signals). The wireless communication device may then identify resources carrying the SSB and/or resources carrying the signals associated with the SSB, and may forward signals in the resources associated with the SSB and in the resources carrying signals associated with the SSB.

In some aspects, communicating in the set of resources includes selecting an SSB to be used in association with performing an access procedure based at least in part on the configuration information, identifying the set of resources based at least in part on the selected SSB, and receiving the selected SSB in the set of resources. For example, the configuration information may include information associated with partitioning resources associated with an access procedure into a first set of resources and a second set of resources, as described above. Here, the wireless communication device may select an SSB to be used in association with performing an access procedure based at least in part on the configuration information (e.g., the wireless communication device may select an SSB corresponding to an SSB index indicated as one for which repeaters are to forward signals). The wireless communication device may then identify the set of resources based at least in part on the selected SSB, and receive the selected SSB in the set of resources.

In some aspects, communicating in the set of resources includes receiving a control message in the set of resources based at least in part on the configuration information. For example, the configuration information may be associated with configuring a parameter associated with control messages for configuring repeaters, as described above. Here, the wireless communication device may receive the configuration information and, thus, may determine the configuration for the parameter associated with control messages. The repeater may then receive a control message in the set of resources based at least in part on the configuration of the parameter.

In some aspects, communicating in the set of resources comprises transmitting or receiving a signal in the set of resources based at least in part on a value for a parameter. For example, the configuration information may be associated with configuring a value for a parameter, as described above. Here, the wireless communication device may receive the configuration information and, thus, may determine the value for the parameter. The repeater may then transmit a communication or receive a communication in the set of resources based at least in part on the value of the parameter.

In some aspects, communicating in the set of resources includes selectively forwarding a signal received in the set of resources based at least in part on a TDD configuration (e.g., a default TDD configuration). For example, the configuration information may include a TDD configuration associated with determining a forwarding direction for a set of resources, as described above. Here, the wireless communication device may receive the configuration information and, thus, determine the forwarding direction for the set of resources. The wireless communication device may then receive a signal in the set of resources and selectively forward (e.g., forward or refrain from forwarding) the signal based at least in part on the forwarding direction.

In some aspects, communicating in the set of resources includes sending a RACH signal in the set of resources based at least in part on the RACH configuration associated with the access procedure. For example, the configuration information may include a RACH configuration associated with an access procedure, as described above. Here, the wireless communication device may receive the configuration information and, thus, determine the RACH configuration. The wireless communication device may then send a RACH signal in the set of resources based at least in part on the RACH configuration. In some aspects, the RACH signal may be a RACH signal that the wireless communication device sends to the base station (e.g., to stablish a link with the base station, to recover from a beam failure, to recover from a link failure, or the like).

In some aspects, the wireless communication device may communicate in the set of resources based at least in part on a beamforming configuration received by the wireless communication device. For example, the base station may provide (e.g., at an earlier time) a beamforming configuration to the wireless communication device, and the wireless communication device may communicate in the set of resources based at least in part on the beamforming configuration.

As indicated above, FIG. 6 is provided as an example. Other examples may differ from what is described with respect to FIG. 6.

Figure 7:
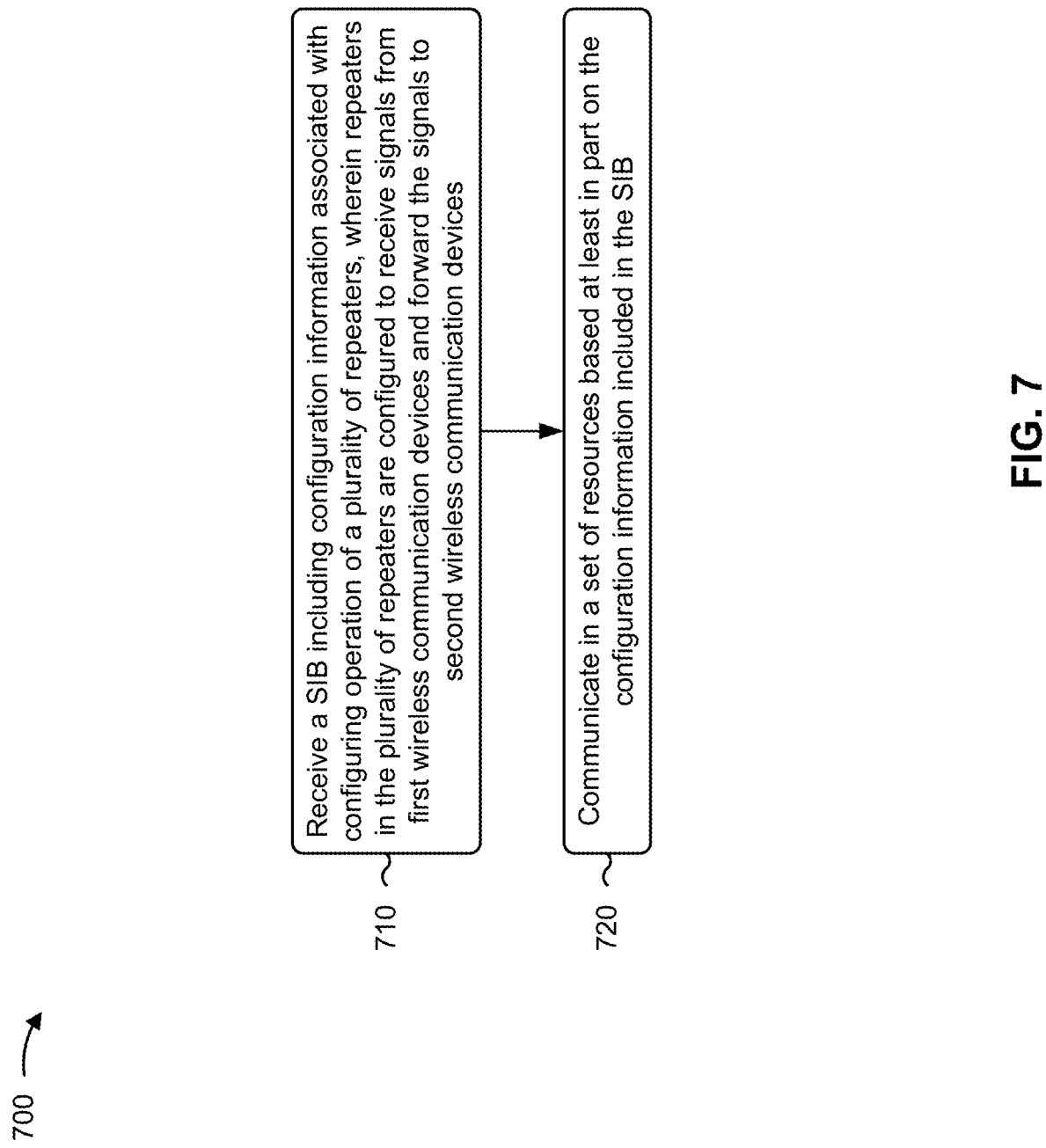
FIG. 7 is a diagram illustrating an example process performed, for example, by a repeater, in accordance with the present disclosure.

FIG. 7 is a diagram illustrating an example process 700 performed, for example, by a wireless communication device, in accordance with the present disclosure. Example process 700 is an example where the wireless communication device (e.g., base station 110, UE 120, mmW repeater 140, or the like) performs operations associated with configuration of a repeater via system information.

As shown in FIG. 7, in some aspects, process 700 may include receiving a SIB including configuration information associated with configuring operation of a plurality of repeaters, wherein repeaters in the plurality of repeaters are configured to receive signals from first wireless communication devices and forward the signals to second wireless communication devices (block 710). For example, the wireless communication device (e.g., using antenna 510/510', gain component 520, controller 530, communication component 510, MUX/DEMUX 550, or the like when the wireless communication device is a mmW repeater 140; using receive processor 258, controller/processor 280, memory 282, and/or the like when the wireless communication device is a UE 120; using receive processor 238, controller/processor 240, memory 242, or the like when the wireless communication device is a base station 110) may receive a SIB including configuration information associated with configuring operation of a plurality of repeaters, wherein repeaters in the plurality of repeaters are configured to receive signals from first wireless communication devices and forward the signals to second wireless communication devices, as described above.

As further shown in FIG. 7, in some aspects, process 700 may include communicating in a set of resources based at least in part on the configuration information included in the SIB (block 720). For example, the wireless communication device (e.g., using antenna 510/510', gain component 520, controller 530, communication component 510, MUX/DEMUX 550, or the like when the wireless communication device is a mmW repeater 140; using receive processor 258, transmit processor 266, controller/processor 280, memory 282, and/or the like when the wireless communication device is a UE 120; using receive processor 238, transmit processor 220, controller/processor 240, memory 242, or the like when the wireless communication device is a base station 110) may communicate in a set of resources based at least in part on the configuration information included in the SIB, as described above.

Process 700 may include additional aspects, such as any single aspect or any combination of aspects described below and/or in connection with one or more other processes described elsewhere herein.

In a first aspect, the configuration information includes information associated with a cell-specific configuration that applies to each repeater of the plurality of repeaters.

In a second aspect, alone or in combination with the first aspect, the configuration information is included in remaining minimum system information in the SIB.

In a third aspect, alone or in combination with one or more of the first and second aspects, the configuration information is included in other system information in the SIB.

In a fourth aspect, alone or in combination with one or more of the first through third aspects, the configuration information is associated with partitioning resources associated with an access procedure into a first set of resources and a second set of resources.

In a fifth aspect, alone or in combination with one or more of the first through fourth aspects, the first set of resources is a set of resources in which signals are not to be forwarded by the plurality of repeaters and the second set of resources is a set of resources in which signals are to be forwarded by the plurality of repeaters.

In a sixth aspect, alone or in combination with one or more of the first through fifth aspects, the configuration information indicates a set of SSB indices associated with either the first set of resources or the second set of resources.

In a seventh aspect, alone or in combination with one or more of the first through sixth aspects, communicating in the set of resources comprises selectively forwarding a signal received in the set of resources based at least in part on the configuration information.

In an eighth aspect, alone or in combination with one or more of the first through seventh aspects, the signal is associated with at least one of: an SSB corresponding to an SSB index of a set of SSB indices, a PDCCH associated with scheduling remaining minimum system information associated with the SSB, a RACH message associated with the SSB, or a PDCCH associated with scheduling a RACH response for the RACH message associated with the SSB.

In a ninth aspect, alone or in combination with one or more of the first through eighth aspects, communicating in the set of resources comprises: selecting a SSB to be used in association with performing an access procedure based at least in part on the configuration information; identifying the set of resources based at least in part on the selected SSB, and receiving the selected SSB in the set of resources.

In a tenth aspect, alone or in combination with one or more of the first through ninth aspects, the configuration information is associated with configuring a parameter associated with control messages.

In an eleventh aspect, alone or in combination with one or more of the first through tenth aspects, the parameter is associated with a cell-specific PDCCH for a DCI format to be used for the control messages.

In a twelfth aspect, alone or in combination with one or more of the first through eleventh aspects, the parameter is associated with a bandwidth part configuration associated with the control messages.

In a thirteenth aspect, alone or in combination with one or more of the first through twelfth aspects, communicating in the set of resources comprises receiving a control message in the set of resources based at least in part on the configuration information.

In a fourteenth aspect, alone or in combination with one or more of the first through thirteenth aspects, the configuration information is associated with configuring a value for a parameter.

In a fifteenth aspect, alone or in combination with one or more of the first through fourteenth aspects, the parameter is a maximum number of beams that can be used by the wireless communication device.

In a sixteenth aspect, alone or in combination with one or more of the first through fifteenth aspects, the parameter is associated with configuring or scheduling the wireless communication device.

In a seventeenth aspect, alone or in combination with one or more of the first through sixteenth aspects, the value is a time offset value.

In an eighteenth aspect, alone or in combination with one or more of the first through seventeenth aspects, the value is an offset or absolute value associated with controlling power of the wireless communication device.

In a nineteenth aspect, alone or in combination with one or more of the first through eighteenth aspects, communicating in the set of resources comprises transmitting or receiving a signal in the set of resources based at least in part on the value for the parameter.

In a twentieth aspect, alone or in combination with one or more of the first through nineteenth aspects, the configuration information includes a default TDD configuration associated with determining a forwarding direction for the set of resources.

In a twenty-first aspect, alone or in combination with one or more of the first through twentieth aspects, the forwarding direction is one of: a downlink forwarding direction, an uplink forwarding direction, a full-duplex forwarding direction, or a null forwarding direction.

In a twenty-second aspect, alone or in combination with one or more of the first through twenty-first aspects, communicating in the set of resources comprises selectively forwarding a signal received in the set of resources based at least in part on the default TDD configuration.

In a twenty-third aspect, alone or in combination with one or more of the first through twenty-second aspects, the configuration information includes a RACH configuration associated with an access procedure.

In a twenty-fourth aspect, alone or in combination with one or more of the first through twenty-third aspects, the access procedure is one of: an initial access procedure, a contention free random access procedure, or a contention based random access procedure.

In a twenty-fifth aspect, alone or in combination with one or more of the first through twenty-fourth aspects, communicating in the set of resources comprises sending a RACH signal received in the set of resources based at least in part on the RACH configuration associated with the access procedure.

In a twenty-sixth aspect, alone or in combination with one or more of the first through twenty-fifth aspects, the wireless communication device is a repeater.

In a twenty-seventh aspect, alone or in combination with one or more of the first through twenty-sixth aspects, the repeater operates in a millimeter wave frequency range.

In a twenty-eighth aspect, alone or in combination with one or more of the first through twenty-seventh aspects, the repeater has a control interface to a base station associated with configuring operation of the repeater.

In a twenty-ninth aspect, alone or in combination with one or more of the first through twenty-eighth aspects, communicating in the set of resources is further based at least in part on a beamforming configuration received by the wireless communication device.

In a thirtieth aspect, alone or in combination with one or more of the first through twenty-ninth aspects, the wireless communication device is an integrated access and backhaul node (e.g., a base station 110).

In a thirty first aspect, alone or in combination with one or more of the first through thirtieth aspects, the wireless communication device is a UE (e.g., a UE 120).

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
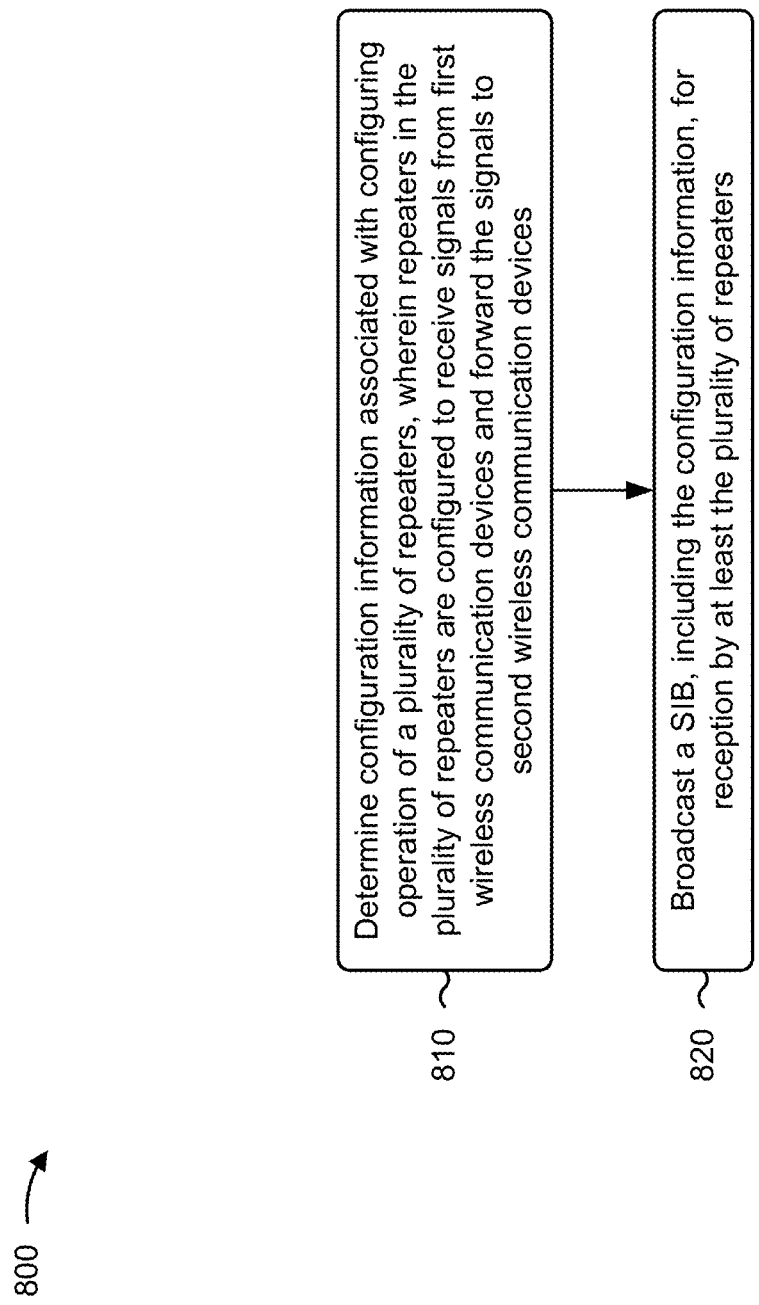
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 and/or the like) performs operations associated with configuration of a repeater via system information.

As shown in FIG. 8, in some aspects, process 800 may include determining configuration information associated with configuring operation of a plurality of repeaters, wherein repeaters in the plurality of repeaters are configured to receive signals from first wireless communication devices and forward the signals to second wireless communication devices (block 810). For example, the base station (e.g., using transmit processor 220, receive processor 238, controller/processor 240, memory 242, and/or the like) may determine configuration information associated with configuring operation of a plurality of repeaters (e.g., a plurality of mmW repeaters 140), wherein repeaters in the plurality of repeaters are configured to receive signals from first wireless communication devices and forward the signals to second wireless communication devices, as described above.

As further shown in FIG. 8, in some aspects, process 800 may include broadcasting a SIB, including the configuration information, for reception by at least the plurality of repeaters (block 820). For example, the base station (e.g., using transmit processor 220, controller/processor 240, memory 242, and/or the like) may broadcast a SIB, including the configuration information, for reception by at least the plurality of repeaters, as described above.

Process 800 may include additional aspects, such as any single aspect or any combination of aspects described below and/or in connection with one or more other processes described elsewhere herein.

In a first aspect, the configuration information includes information associated with a cell-specific configuration that applies to each repeater of the plurality of repeaters.

In a second aspect, alone or in combination with the first aspect, the configuration information is included in remaining minimum system information in the SIB.

In a third aspect, alone or in combination with one or more of the first and second aspects, the configuration information is included in other system information in the SIB.

In a fourth aspect, alone or in combination with one or more of the first through third aspects, the configuration information is associated with partitioning resources associated with an access procedure into a first set of resources and a second set of resources.

In a fifth aspect, alone or in combination with one or more of the first through fourth aspects, the first set of resources is a set of resources in which signals are not to be forwarded by the plurality of repeaters and the second set of resources is a set of resources in which signals are to be forwarded by the plurality of repeaters.

In a sixth aspect, alone or in combination with one or more of the first through fifth aspects, the configuration information indicates a set of SSB indices associated with either the first set of resources or the second set of resources.

In a seventh aspect, alone or in combination with one or more of the first through sixth aspects, the configuration information is associated with configuring a parameter associated with control messages.

In an eighth aspect, alone or in combination with one or more of the first through seventh aspects, the parameter is associated with a cell-specific PDCCH for a DCI format to be used for the control messages.

In a ninth aspect, alone or in combination with one or more of the first through eighth aspects, the parameter is associated with a bandwidth part configuration associated with the control messages.

In a tenth aspect, alone or in combination with one or more of the first through ninth aspects, the configuration information is associated with configuring a value for a parameter.

In an eleventh aspect, alone or in combination with one or more of the first through tenth aspects, the parameter is associated with a maximum number of beams that can be used by a repeater of the plurality of repeaters.

In a twelfth aspect, alone or in combination with one or more of the first through eleventh aspects, the parameter is associated with configuring or scheduling a repeater of the plurality of repeaters.

In a thirteenth aspect, alone or in combination with one or more of the first through twelfth aspects, the value is a time offset value.

In a fourteenth aspect, alone or in combination with one or more of the first through thirteenth aspects, the value is an offset or absolute value associated with controlling power of a repeater of the plurality of repeaters.

In a fifteenth aspect, alone or in combination with one or more of the first through fourteenth aspects, the configuration information includes a default TDD configuration associated with determining a forwarding direction for a set of resources.

In a sixteenth aspect, alone or in combination with one or more of the first through fifteenth aspects, the forwarding direction is one of: a downlink forwarding direction, an uplink forwarding direction, a full-duplex forwarding direction, or a null forwarding direction.

In a seventeenth aspect, alone or in combination with one or more of the first through sixteenth aspects, the configuration information includes a RACH configuration associated with an access procedure.

In an eighteenth aspect, alone or in combination with one or more of the first through seventeenth aspects, the access procedure is one of: an initial access procedure, a contention free random access procedure, or a contention based random access procedure.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a wireless communication device, comprising: receiving a system information block (SIB) including configuration information associated with configuring operation of a plurality of repeaters, wherein repeaters in the plurality of repeaters are configured to receive signals from first wireless communication devices and forward the signals to second wireless communication devices; and communicating in a set of resources based at least in part on the configuration information included in the SIB.

Aspect 2: The method of Aspect 1, wherein the configuration information includes information associated with a cell-specific configuration that applies to each repeater of the plurality of repeaters.

Aspect 3: The method of any of Aspects 1-2, wherein the configuration information is included in remaining minimum system information in the SIB.

Aspect 4: The method of any of Aspects 1-3, wherein the configuration information is included in other system information in the SIB.

Aspect 5: The method of any of Aspects 1-4, wherein the configuration information is associated with partitioning resources associated with an access procedure into a first set of resources and a second set of resources.

Aspect 6: The method of Aspect 5, wherein the first set of resources is a set of resources in which signals are not to be forwarded by the plurality of repeaters and the second set of resources is a set of resources in which signals are to be forwarded by the plurality of repeaters.

Aspect 7: The method of any of Aspects 5-6, wherein the configuration information indicates a set of synchronization signal block (SSB) indices associated with either the first set of resources or the second set of resources.

Aspect 8: The method of any of Aspects 5-7, wherein communicating in the set of resources comprises selectively forwarding a signal received in the set of resources based at least in part on the configuration information.

Aspect 9: The method of Aspect 8, wherein the signal is associated with at least one of: an SSB corresponding to an SSB index of a set of SSB indices, a physical downlink control channel (PDCCH) associated with scheduling remaining minimum system information associated with the SSB, a random access channel (RACH) message associated with the SSB, or a PDCCH associated with scheduling a RACH response for the RACH message associated with the SSB.

Aspect 10: The method of any of Aspects 5-9, wherein communicating in the set of resources comprises: selecting a synchronization signal block (SSB) to be used in association with performing an access procedure based at least in part on the configuration information; identifying the set of resources based at least in part on the selected SSB; and receiving the selected SSB in the set of resources.

Aspect 11: The method of any of Aspects 1-4, wherein the configuration information is associated with configuring a parameter associated with control messages.

Aspect 12: The method of Aspect 11, wherein the parameter is associated with a cell-specific physical downlink control channel (PDCCH) for a downlink control information (DCI) format to be used for the control messages.

Aspect 13: The method of any of Aspects 11-12, wherein the parameter is associated with a bandwidth part configuration associated with the control messages.

Aspect 14: The method of any of Aspects 11-13, wherein communicating in the set of resources comprises receiving a control message in the set of resources based at least in part on the configuration information.

Aspect 15: The method of any of Aspects 1-4, wherein the configuration information is associated with configuring a value for a parameter.

Aspect 16: The method of Aspect 15, wherein the parameter is a maximum number of beams that can be used by the wireless communication device.

Aspect 17: The method of any of Aspects 15-16, wherein the parameter is associated with configuring or scheduling the wireless communication device.

Aspect 18: The method of any of Aspects 15-17, wherein the value is a time offset value.

Aspect 19: The method of any of Aspects 15-17, wherein the value is an offset or absolute value associated with controlling power of the wireless communication device.

Aspect 20: The method of any of Aspects 15-19, wherein communicating in the set of resources comprises transmitting or receiving a signal in the set of resources based at least in part on the value for the parameter.

Aspect 21: The method of any of Aspects 1-4, wherein the configuration information includes a default time division duplexing (TDD) configuration associated with determining a forwarding direction for the set of resources.

Aspect 22: The method of Aspect 21, wherein the forwarding direction is one of: a downlink forwarding direction, an uplink forwarding direction, a full-duplex forwarding direction, or a null forwarding direction.

Aspect 23: The method of any of Aspects 21-22, wherein communicating in the set of resources comprises selectively forwarding a signal received in the set of resources based at least in part on the default TDD configuration.

Aspect 24: The method of any of Aspects 21-23, wherein the configuration information includes a random access channel (RACH) configuration associated with an access procedure.

Aspect 25: The method of Aspect 24, wherein the access procedure is one of: an initial access procedure, a contention free random access procedure, or a contention based random access procedure.

Aspect 26: The method of any of Aspects 24-25, wherein communicating in the set of resources comprises sending a RACH signal in the set of resources based at least in part on the RACH configuration associated with the access procedure.

Aspect 27: The method of any of Aspects 1-26, wherein the wireless communication device is a repeater.

Aspect 28: The method of Aspect 27, wherein the repeater operates in a millimeter wave frequency range.

Aspect 29: The method of any of Aspects 27-28, wherein the repeater has a control interface to a base station associated with configuring operation of the repeater.

Aspect 30: The method of any of Aspects 1-29, wherein communicating in the set of resources is further based at least in part on a beamforming configuration received by the wireless communication device.

Aspect 31: The method of any of Aspects 1-25 and 29, wherein the wireless communication device is an integrated access and backhaul node.

Aspect 32: The method of any of Aspects 1-25 and 29-30, wherein the wireless communication device is a user equipment.

Aspect 33: A method of wireless communication performed by a base station, comprising: determining configuration information associated with configuring operation of a plurality of repeaters, wherein repeaters in the plurality of repeaters are configured to receive signals from first wireless communication devices and forward the signals to second wireless communication devices; and broadcasting a system information block (SIB), including the configuration information, for reception by at least the plurality of repeaters.

Aspect 34: The method of Aspect 33, wherein the configuration information includes information associated with a cell-specific configuration that applies to each repeater of the plurality of repeaters.

Aspect 35: The method of any of Aspects 33-34, wherein the configuration information is included in remaining minimum system information in the SIB.

Aspect 36: The method of any of Aspects 33-35, wherein the configuration information is included in other system information in the SIB.

Aspect 37: The method of any of Aspects 33-36, wherein the configuration information is associated with partitioning resources associated with an access procedure into a first set of resources and a second set of resources.

Aspect 38: The method of Aspect 37, wherein the first set of resources is a set of resources in which signals are not to be forwarded by the plurality of repeaters and the second set of resources is a set of resources in which signals are to be forwarded by the plurality of repeaters.

Aspect 39: The method of any of Aspects 37-38, wherein the configuration information indicates a set of synchronization signal block (SSB) indices associated with either the first set of resources or the second set of resources.

Aspect 40: The method of any of Aspects 33-36, wherein the configuration information is associated with configuring a parameter associated with control messages.

Aspect 41: The method of Aspect 40, wherein the parameter is associated with a cell-specific physical downlink control channel (PDCCH) for a downlink control information (DCI) format to be used for the control messages.

Aspect 42: The method of any of Aspects 40-41, wherein the parameter is associated with a bandwidth part configuration associated with the control messages.

Aspect 43: The method of any of Aspects 33-36, wherein the configuration information is associated with configuring a value for a parameter.

Aspect 44: The method of Aspect 43, wherein the parameter is associated with a maximum number of beams that can be used by a repeater of the plurality of repeaters.

Aspect 45: The method of any of Aspects 43-44, wherein the parameter is associated with configuring or scheduling a repeater of the plurality of repeaters.

Aspect 46: The method of any of Aspects 43-45, wherein the value is a time offset value.

Aspect 47: The method of any of Aspects 43-45, wherein the value is an offset or absolute value associated with controlling power of a repeater of the plurality of repeaters.

Aspect 48: The method of any of Aspects 33-36, wherein the configuration information includes a default time division duplexing (TDD) configuration associated with determining a forwarding direction for a set of resources.

Aspect 49: The method of Aspect 48, wherein the forwarding direction is one of: a downlink forwarding direction, an uplink forwarding direction, a full-duplex forwarding direction, or a null forwarding direction.

Aspect 50: The method of any of Aspects 33-36, wherein the configuration information includes a random access channel (RACH) configuration associated with an access procedure.

Aspect 51: The method of Aspect 50, wherein the access procedure is one of: an initial access procedure, a contention free random access procedure, or a contention based random access procedure.

Aspect 52: An apparatus for wireless communication at a device, comprising a processor; memory coupled with the processor; and instructions stored in the memory and executable by the processor to cause the apparatus to perform the method of one or more Aspects of Aspects 1-32.

Aspect 53: A device for wireless communication, comprising a memory and one or more processors coupled to the memory, the memory and the one or more processors configured to perform the method of one or more Aspects of Aspects 1-32.

Aspect 54: An apparatus for wireless communication, comprising at least one means for performing the method of one or more Aspects of Aspects 1-32.

Aspect 55: A non-transitory computer-readable medium storing code for wireless communication, the code comprising instructions executable by a processor to perform the method of one or more Aspects of Aspects 1-32.

Aspect 56: A non-transitory computer-readable medium storing a set of instructions for wireless communication, the set of instructions comprising one or more instructions that, when executed by one or more processors of a device, cause the device to perform the method of one or more Aspects of Aspects 1-32.

Aspect 57: An apparatus for wireless communication at a device, comprising a processor; memory coupled with the processor; and instructions stored in the memory and executable by the processor to cause the apparatus to perform the method of one or more Aspects of Aspects 33-51.

Aspect 58: A device for wireless communication, comprising a memory and one or more processors coupled to the memory, the memory and the one or more processors configured to perform the method of one or more Aspects of Aspects 33-51.

Aspect 59: An apparatus for wireless communication, comprising at least one means for performing the method of one or more Aspects of Aspects 33-51.

Aspect 60: A non-transitory computer-readable medium storing code for wireless communication, the code comprising instructions executable by a processor to perform the method of one or more Aspects of Aspects 33-51.

Aspect 61: A non-transitory computer-readable medium storing a set of instructions for wireless communication, the set of instructions comprising one or more instructions that, when executed by one or more processors of a device, cause the device to perform the method of one or more Aspects of Aspects 33-51.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
receiving a system information block (SIB) including configuration information associated with configuring operation of a plurality of repeaters,
wherein repeaters in the plurality of repeaters are configured to receive signals from first wireless communication devices and forward the received signals to second wireless communication devices, wherein the configuration information is associated with partitioning resources associated with performing a random access channel (RACH) procedure into a first set of resources and a second set of resources, and
wherein the first set of resources are allocated for providing direct connections between the first wireless communication devices and the second wireless communication devices and the second set of resources are allocated for providing indirect connections between the first wireless communication devices and the second wireless communication devices; and
communicating in a set of resources based at least in part on the configuration information included in the SIB.

2. The method of claim 1, wherein the configuration information includes information associated with a cell-specific configuration that applies to each repeater of the plurality of repeaters.

3. The method of claim 1, wherein the configuration information is included in remaining minimum system information in the SIB or other system information in the SIB.

4. The method of claim 1, wherein the configuration information is received via a backhaul link established between the wireless communications device and a network node.

5. The method of claim 1, wherein the first set of resources is a set of resources in which signals are not to be forwarded by the plurality of repeaters and the second set of resources is a set of resources in which signals are to be forwarded by the plurality of repeaters.

6. The method of claim 1, wherein the configuration information indicates a set of synchronization signal block (SSB) indices associated with either the first set of resources or the second set of resources.

7. The method of claim 1, wherein communicating in the set of resources comprises selectively forwarding a signal received in the set of resources based at least in part on the configuration information.

8. The method of claim 7, wherein the signal received in the set of resources is associated with at least one of:
a synchronization signal block (SSB) corresponding to an SSB index of a set of SSB indices,
a physical downlink control channel (PDCCH) associated with scheduling remaining minimum system information associated with the SSB,
a RACH message associated with the SSB, or
a PDCCH associated with scheduling a RACH response for the RACH message associated with the SSB.

9. The method of claim 1, wherein communicating in the set of resources comprises:
selecting a synchronization signal block (SSB) to be used in association with performing the RACH procedure based at least in part on the configuration information;
identifying the set of resources based at least in part on the selected SSB; and
receiving the selected SSB in the set of resources.

10. The method of claim 1, wherein the configuration information is associated with configuring a parameter associated with control messages.

11. The method of claim 10, wherein the parameter is associated with a cell-specific physical downlink control channel (PDCCH) for a downlink control information (DCI) format to be used for the control messages.

12. The method of claim 10, wherein the parameter is associated with a bandwidth part configuration associated with the control messages.

13. The method of claim 1, wherein communicating in the set of resources comprises receiving a control message in the set of resources based at least in part on the configuration information.

14. The method of claim 1, wherein the configuration information is associated with configuring a value for a parameter.

15. The method of claim 14, wherein the parameter is a maximum number of beams that can be used by the wireless communication device or is associated with configuring or scheduling the wireless communication device.

16. The method of claim 14, wherein the value is a time offset value or is an offset or absolute value associated with controlling power of the wireless communication device.

17. The method of claim 14, wherein communicating in the set of resources comprises transmitting or receiving a signal in the set of resources based at least in part on the value for the parameter.

18. The method of claim 1, wherein the configuration information includes a default time division duplexing (TDD) configuration associated with determining a forwarding direction for the set of resources.

19. The method of claim 18, wherein the forwarding direction is one of:
a downlink forwarding direction,
an uplink forwarding direction,
a full-duplex forwarding direction, or
a null forwarding direction.

20. The method of claim 18, wherein communicating in the set of resources comprises selectively forwarding a signal received in the set of resources based at least in part on the default TDD configuration.

21. The method of claim 1, wherein the configuration information includes a RACH configuration associated with the RACH procedure.

22. The method of claim 21, wherein the RACH procedure is one of:
a contention free random access procedure, or
a contention based random access procedure.

23. The method of claim 21, wherein communicating in the set of resources comprises sending a RACH signal in the set of resources based at least in part on the RACH configuration associated with the RACH procedure.

24. The method of claim 1, wherein the wireless communication device is an analog millimeter wave repeater.

25. A method of wireless communication performed by a network entity, comprising:
determining configuration information associated with configuring operation of a plurality of repeaters,
wherein repeaters in the plurality of repeaters are configured to receive signals from first wireless communication devices and forward the received signals to second wireless communication devices,
wherein the configuration information is associated with partitioning resources associated with a random access channel (RACH) procedure into a first set of resources and a second set of resources, and
wherein the first set of resources are allocated for providing direct connections between the first wireless communication devices and the second wireless communication devices and the second set of resources are allocated for providing indirect connections between the first wireless communication devices and the second wireless communication devices; and broadcasting a system information block (SIB), including the configuration information, for reception by at least the plurality of repeaters.

26. The method of claim 25, wherein the configuration information includes information associated with a cell-specific configuration that applies to each repeater of the plurality of repeaters.

27. The method of claim 25, wherein the configuration information is included in remaining minimum system information in the SIB or other system information in the SIB.

28. The method of claim 25, wherein the configuration information is at least one of:
configuring a parameter associated with control messages, configuring a value for a parameter,
includes a default time division duplexing (TDD) configuration associated with determining a forwarding direction for a set of resources, or
includes a random access channel (RACH) configuration associated with the RACH procedure.

29. A wireless communication device for wireless communication, comprising:
a memory; and
one or more processors coupled to the memory, the one or more processors configured to:
receive a system information block (SIB) including configuration information associated with configuring operation of a plurality of repeaters,
wherein repeaters in the plurality of repeaters are configured to receive signals from first wireless communication devices and forward the received signals to second wireless communication devices,
wherein the configuration information is associated with partitioning resources associated with a random access channel (RACH) procedure into a first set of resources and a second set of resources, and
wherein the first set of resources are allocated for providing direct connections between the first wireless communication devices and the second wireless communication devices and the second set of resources are allocated for providing indirect connections between the first wireless communication devices and the second wireless communication devices; and
communicate in a set of resources based at least in part on the configuration information included in the SIB.

30. A network entity for wireless communication, comprising:
a memory; and
one or more processors coupled to the memory, the one or more processors configured to:
determine configuration information associated with configuring operation of a plurality of repeaters,
wherein repeaters in the plurality of repeaters are configured to receive signals from first wireless communication devices and forward the received signals to second wireless communication devices,
wherein the configuration information is associated with partitioning resources associated with a random access channel (RACH) procedure into a first set of resources and a second set of resources, and
wherein the first set of resources are allocated for providing direct connections between the first wireless communication devices and the second wireless communication devices and the second set of resources are allocated for providing indirect connections between the first wireless communication devices and the second wireless communication devices; and
broadcast a system information block (SIB), including the configuration information, for reception by at least the plurality of repeaters.

* * * * *